United States Patent [19]

Koyama et al.

[11] Patent Number: 5,203,997
[45] Date of Patent: Apr. 20, 1993

[54] HYDROPHILIC POROUS MEMBRANE, METHOD OF MANUFACTURING THE SAME AND LIQUID FILTER USING THE SAME

[75] Inventors: Noriyuki Koyama, Fuji; Shinsuke Yokomati, Fujinomiya; Yasushi Nemoto; Makoto Ohnishi, both of Fuji, all of Japan

[73] Assignee: Terumo Kabushiki Kaisha, Tokyo, Japan

[21] Appl. No.: 345,244

[22] Filed: May 1, 1989

[30] Foreign Application Priority Data

May 2, 1988 [JP] Japan .................. 63-109777
Sep. 6, 1988 [JP] Japan .................. 63-222871

[51] Int. Cl.$^5$ ............................. B01D 71/34
[52] U.S. Cl. ........................ 210/490; 210/500.36
[58] Field of Search ............ 210/490, 508, 500.36, 210/500.23; 427/44, 245, 342

[56] References Cited

U.S. PATENT DOCUMENTS

| | | | |
|---|---|---|---|
| 4,113,912 | 9/1978 | Okita | 428/290 |
| 4,203,847 | 5/1980 | Grandine | 210/490 |
| 4,280,970 | 7/1981 | Kesting | 210/650 X |
| 4,399,035 | 8/1983 | Hohmi et al. | 210/500.23 |
| 4,470,859 | 9/1984 | Benezra et al. | 210/508 X |
| 4,501,793 | 2/1985 | Sarada | 210/500.36 X |
| 4,776,959 | 10/1988 | Kasai et al. | 210/490 |
| 4,844,811 | 7/1989 | Gotlieb et al. | 210/703 |

FOREIGN PATENT DOCUMENTS

| | | |
|---|---|---|
| 129420 | 12/1984 | European Pat. Off. . |
| 288380 | 10/1988 | European Pat. Off. . |
| 3043073 | 6/1992 | Fed. Rep. of Germany . |
| 2361439 | 3/1978 | France . |
| 84/00015 | 1/1984 | World Int. Prop. O. . |

*Primary Examiner*—Frank Spear
*Attorney, Agent, or Firm*—Burns, Doane, Swecker & Mathis

[57] ABSTRACT

A hydrophilic porous membrane is obtained by covering porous membrane substrate with a non-ionic, amino-acid-based or non-ionic fluorine-based surface active agent. For the covering, the porous membrane substrate is immersed in a solution containing the surface active agent and then drying the membrane substrate. A different hydrophilic porous membrane is obtained by providing the surfaces of a porous membrane substrate and inner pore surfaces with a polar group and then covering the membrane substrate with a hydrophilic polymer film. For this covering, after introduction of the polar group to the surfaces of the porous membrane substrate and inner pore surfaces, the membrane substrate is immersed in a solution containing a hydrophilic substance and then dried. In a liquid filter using any of these hydrophilic porous membrane, the porous membrane is disposed in a housing such as to divide the housing inner space into two sub-spaces respectively communicating with a liquid inlet and a filtrate outlet provided on the housing.

7 Claims, No Drawings

HYDROPHILIC POROUS MEMBRANE, METHOD OF MANUFACTURING THE SAME AND LIQUID FILTER USING THE SAME

BACKGROUND OF THE INVENTION

This invention relates to a hydrophilic porous membrane, a method of manufacturing the same and a liquid filter using the same.

In the general solution administration filter for medical treatment, a porous membrane is used as a filter for removing foreign particles and bacteria in solution administration. Such a porous membrane should be superior in mechanical strength and separation performance.

Heretofore, to obtain a porous membrane having excellent mechanical strength and separation performance a hydrophobic porous membrane is rendered to be hydrophilic. This may be done, for instance, by a method, in which the membrane surface is given a hydrophilic group by using an aqueous solution containing such alkali as NaOH or KOH, as disclosed in Japanese Patent Disclosure 58-93734, or by a method, in which a hydrophobic porous membrane is immersed in alcohol, then treated with an aqueous solution of water-soluble polymer and then dried, followed by rendering the water-soluble polymer remaining on the surface insoluble with heat rays or like means, as disclosed in Japanese Patent Disclosure 54-17978.

However, the above methods of rendering a hydrophobic porous membrane hydrophilic have the following problems. In the former method, in which the membrane surface is given a hydrophilic group in a treatment with an aqueous solution of alkali, the mechanical strength of the membrane is liable to be reduced. In the latter method, in which the membrane is treated with an aqueous solution of a water-soluble polymer and then dried, followed by rendering the residual polymer insoluble with heat rays or the like, a long time is required from alcohol osmosis until substitution with the aqueous solution of polymer. Further, at the time of treatment of rendering the residual polymer insoluble, the pore diameter of micropores of the membrane is liable to be changed to deteriorate the separation performace.

SUMMARY OF THE INVENTION

This invention has been intended in view of the above problems, and its object is to provide a hydrophilic porous membrane, a method of manufacturing the same and a liquid filter using the same, which is excellent in the mechanical strength and separation performance, can be used for medical purposes as well as general purposes and is excellent in safety.

To solve the prior art problems as discussed above, according to the invention there is provided a hydrophilic porous membrane, which is obtained by covering the surfaces of a hydrophobic porous membrane substrate and inner pore surfaces with a non-ionic surface active agent. The non-ionic surface active agent is suitable propyleneoxide/ethyleneoxide block copolymer. Further, where the porous membrane is used in a field requiring safety such as medical purposes, the ethyleneoxide chain of the copolymer suitable constitutes 60 to 90% by weight of the whole molecule. The hydrophilic porous membrane is manufactured by immersing a hydrophobic porous membrane substrate in a solution containing a non-ionic surface active agent and then drying the membrane substrate.

According to the invention, there is also provided a hydrophilic porous membrane, which is obtained by covering the surfaces of a hydrophobic porous membrane substrate and inner pore surfaces with a surface active agent based on an amino acid. As the hydrophilic group of the surface active agent based on amino acid may suitably be amino acid or L-glutamic acid. Further, the hydrophobic group of the surface active agent based on amino acid is suitably fatty acid. This hydrophilic porous membrane is manufactured by immersing a hydrophobic porous membrane substrate in a solution containing a surface active agent based on amino acid and then drying the membrane substrate.

According to the invention, there is further provided a hydrophilic porous membrane, which is obtained by covering the surfaces of fluorine-based porous membrane substrate and inner pore surfaces with a nonionic surface active agent based on fluorine. The surface active agent based on fluorine suitably constitutes 7.5 to 12.5% by weight of the porous membrane substrate. The surface active agent based on fluorine is suitably obtained by adding ethyleneoxide to perfluoroalkyl chain. Further, the porous membrane substrate based on fluorine suitably consists of a member of a group consisting of copolymer and mixtures of vinylidene fluoride and propylene hexafluoride. This hydrophilic porous membrane is manufactured by immersing the porous membrane substrate based on fluorine in a solution containing a non-ionic surface active agent based on fluorine and then drying the membrane substrate.

According to the invention, there is still further provided a hydrophilic porous membrane, which is obtained by giving a polar group to the surfaces of a hydrophobic porous membrane substrate and inner pore surfaces and covering the system with a hydrophilic polymer layer. The hydrophilic porous membrane suitably consists of a member of a group consisting of halogenated vinyl, halogenated vinylidene and copolymer and mixtures of these compounds. Further, the polar group is synthesized through alkyl hydrogensulfate as intermediate product and suitably contains a hydroxyl group. This hydrophilic porous membrane is manufactured by introducing a polar group to the surfaces of a hydrophobic porous membrane substrate and inner pore surfaces, then immersing the system in a solution containing a hydrophilic substance and then drying the membrane substrate. The polar group is suitably introduced by immersing the hydrophobic porous membrane substrate in sulfuric acid and then washing the membrane substrate with water.

Further, according to the invention, there is provided a liquid filter using a hydrophilic porous membrane having the structure as described above, which comprises a housing having an inner space, a liquid inlet and a filtrate outlet, the hydrophilic porous membrane being accommodated in the housing inner space such as to divide the inner space into inlet and outlet side space sections communicating with the liquid inlet and filtrate outlet, respectively.

Since the hydrophilic porous membrane according to the invention is obtained by covering a porous membrane substrate with a non-ionic surface active agent or a surface active agent based on amino acid or a nonionic surface active agent based on fluorine or covering the membrane substrate with a hydrophilic polymer film via a polar group, it never has cythemolytic toxicity or cytotoxicity and is very safe without need of any aftertreatment such as rendering water-soluble substances insoluble. The porous membrane according to the invention is thus particularly suited for medical purposes and is capable of application in various fields.

Further, in the method of manufacture of the hydrophilic porous membrane, a high degree of hydrophilicity can be obtained with a simple treatment and without need of any special treatment with heat, radiation, acid or alkali, so that there is no possibility of reducing the mechanical strength and separation performance of the hydrophobic porous membrane.

Further, with the liquid filter using the hydrophilic porous membrane according to the invention, excellent safety and sufficient filtering property can be obtained with the hydrophilic porous membrane. Thus, the liquid filter can be suitably used as a filter in a solution administration system in a medical field.

The above and other objects and advantages of the invention will become more apparent from the following description of the preferred embodiments.

DESCRIPTION OF THE PREFERRED EMBODIMENT

Now, preferred embodiments of the invention will be described.

A first embodiment of the hydrophilic porous membrane according to the invention is obtained by using a hydrophobic porous membrane substrate having innumerable pores and covering the surfaces of the membrane substrate and inner pore surfaces with a non-ionic surface active agent.

This porous membrane is manufactured by merely immersing the hydrophobic porous membrane substrate in a solution containing the non-ionic surface active agent and drying the membrane substrate. The operation involved thus is very simple. As the solvent may be used any solvent, in which the non-ionic surface active agent is soluble, and which has affinity to the hydrophobic porous membrane substrate, but in which the membrane substrate is insoluble. It is possible to use water as solvent. In this case, it will be necessary to preliminarily render the hydrophobic porous membrane substrate hydrophilic through water substitution by immersing it in alcohol.

As the non-ionic surface active agent, propyleneoxide/ethyleneoxide copolymer is suitably used. Where the porous membrane is used for medical purposes in which safety is particularly required, the ethyleneoxide chain of the copolymer suitably constitutes 60 to 90% by weight of the whole molecule. Further, it is suitably a lower alcohol, e.g., methanol, ethanol and propanol. If ethyleneoxide constitutes less than 60% by weight of the whole molecule, the copolymer may have toxity, so that it is sometimes not suited for medical purposes although it can be used for general purposes. If ethyleneoxide constitutes more than 90% by weight, the affinity to hydrophobic substance will be poor because of less propylene oxide chain as hydrophobic group. For this reason, it is difficult to let the non-ionic surface active agent be attached uniformly to the hydrophobic porous membrane, and a membrane lacking in uniformity of hydrophilicity is liable to result.

The hydrophobic porous membrane substrate may be made of materials which are not particularly limited. For example, it may be made of a fluorine-based polymer material consisting of copolymer or mixture of polytetra-fluoroethane, polyvinylidene fluoride and other polymers. More specifically, polyolefin polymers, e.g., polyethylene and polypropylene are used.

The non-ionic surface active agent with 60 to 90% by weight of ethyleneoxide chain noted above, has very excellent biological safety and hence provides no toxicity even when its total amount used in the process flows out. Thus, there is no need of rendering the membrane insoluble. Where other surface active agents or other agents for water-soluble agents for providing hydrophilicity are used, the scope of use is extremely limited due to toxicity. Further, where a process for providing insolubility is possible, the process will be very complicated and is liable to deteriorate the mechanical strength and separation performance of the membrane. For this reason, only limited hydrophobic porous membranes may be used.

The hydrophilic porous membrane using the non-ionic surface active agent noted above in the instant embodiment, can be obtained by merely simply treating the hydrophobic porous membrane substrate and does not require a special process with heat, radiation, acid or alkali as in the prior art. Thus, the mechanical strength and separation performance inherent in the hydrophobic porous membrane substrate are not deteriorated, and also there are no limitations on the membrane material. Thus, this embodiment of porous membrane can be suitably used for medical purposes.

The inventors conducted the following experiments to confirm the effects of the first embodiment of the hydrophilic porous membrane.

EXAMPLE 1

A polyvinylidene fluoride porous membrane substrate with an average pore diameter of 0.45 $\mu$m and a porosity of 78% was prepared, and this membrane substrate was held immersed for 30 seconds, in a 5.0 wt. % methanol solution of propyleneoxide/ethyleneoxide block copolymer with 80% by weight of ethyleneoxide chain (e.g. "Pulronik F-68", a trade name by Asahi Denka Kogyo K.K.), and then the membrane substrate was dried in an oven at 60° C., thus obtaining a hydrophilic porous membrane. This membrane was immersed in distilled water. At this time, it instantly and uniformly absorbed water, showing satisfactory hydrophilicity.

Further, its cytotoxicity and cythemolic toxicity were examined with a 100 times autoclave extract, and it showed no toxicity at all. Thus, it was confirmed to be very safe and suited for medical purposes.

EXAMPLE 2

The same porous membrane substrate as in Example 1 was prepared and processed under the same conditions as in Example 1 except for that propyleneoxide/ethyleneoxide block copolymer with 10% by weight of ethyleneoxide chain (i.e., "Pulromnik L-101" a trade name by Asahi Denka Kogyo K.K.) was used as surface active agent, thus obtaining hydrophilic porous membrane. This membrane was immersed in distilled water. At this time, it instantly and uniformly absorbed water, showing satisfactory hydrophilicity. The cytotoxicity and cythemolic toxicity were examined with a 100 times autoclave extract as in Example 1. These toxicities were found to be very slight, so that the membrane was found to be capable of use for general purposes such as refinement of industrial water and purification of life water.

A second embodiment will now be described. This embodiment of the hydrophilic porous membrane is obtained by covering the surfaces of a hydrophobic porous membrane substrate and inner pore surfaces with a surface active agent based on amino acid, particularly an anionic surface active agent based on amino acid. The membrane is manufactured by merely immersing the hydrophobic porous membrane substrate in a solution containing the surface active agent based on amino acid and then drying the membrane substrate. The operation involved thus is very simple. As the solvent may be used any solvent, in which the surface active agent is soluble, and which has affinity to the hydrophobic porous membrane substrate, but in which the membrane substrate is insoluble. It is possible to use water as solvent. In this case, it will be necessary to preliminarily render the hydrophobic porous membrane substrate hydrophilic by immersing it in lower alcohol or the like. In this embodiment, the surface active agent used is based on amino acid. In this case, lower alcohol, particularly, methanol, is suited. This surface active agent is excellent in biological safety, and provides no toxicity even when it flows out in use. Thus, there is no need of rending it insoluble. Other surface active agents or water-soluble agents for providing hydroagents or water-soluble agents for providing hydrophilicity have very limited scopes of use because they have toxicity. Where a process for providing insolubility, the process is very complicated. Further, the mechanical strength and separation performance of the membrane are liable to be deteriorated. For this reason, only limited hydrophobic porous membrane can be used.

The inventors conducted the following experiments to confirm the effects of the second embodiment of the hydrophilic porous membrane.

EXAMPLE 3

A polyvinylidene fluoride porous membrane with an average pore diameter of 0.45 μm and a porosity of 78.6% was prepared. It was immersed in a 5.0 wt. % methanol solution of a surface active agent consisting of N-lauroil-L-sodium glutamate (i.e., "LS-11", a trade name by Ajinomoto K.K.) and then dried to obtain a hydrophilic porous membrane. This membrane was immersed in distilled water, and it showed satisfactory hydrophilicity. Its cytotoxicity and cythemolic toxicity were examined with a 100 times autoclave extract. It showed no toxicity and was thus found to be very safe.

COMPARATIVE EXAMPLE 1

A hydrophilic porous membrane was obtained in the same way as Example 3 except for that polyoxyethyleneP-tert-octylphenylether (i.e., "Triton X-100, a trade name by Kodak) was used as surface active agent. This membrane was immersed in distilled water, and it showed satisfactory hydrophilicity. However, when its cytotoxicity and cythemolic toxicity were examined with a 100 times autoclave exatract, very high toxicities were shown, so that the membrane was found to be incapable of use for medical and like purposes requiring safety.

A third embodiment of the invention will now be described. This embodiment of the hydrophilic porous membrane is obtained by covering the surfaces of a porous membrane substrate based on fluorine and inner pore surfaces with a non-ionic surface active agent based on fluorine. This membrane is manufactured by merely immersing the fluorine-based porous membrane substrate in a solution containing the non-ionic fluorine-based surface active agent and then drying the membrane substrate. The operation involved thus is very simple. The solvent may be any solvent, in which the non-ionic fluorine-based surface active agent is soluble, and in which the fluorine-based porous membrane substrate is insoluble. Suitably, it is a lower alcohol, e.g., methanol, ethanol and propanol.

The amount of the non-ionic fluorine-based surface active agent is suitably 7.5 to 12.5% by weight. If the amount is less than 7.5% by weight of the fluorine-based porous membrane substrate, the membrane can not be uniformly rendered hydrophilic, and the separation performance of the membrane is liable to be deteriorated. If the amount is above 12.5% by weight, extract will show toxicity, i.e., cytotoxicity and cythemolic toxicity. As the fluorine-based surface active agent, what is obtained by adding ethyleneoxide to perfluoroalkyl is suited from the standpoints of the hydrophilicity and safety. The fluorine-based porous membrane substrate is made of a fluorine-based polymer consisting of a member of a group, consisting of polytetrafluoroethylene polyvinylidens fluoride and copolymers and mixtures of polyvinylidens fluoride and other polymer or polymers.

This embodiment of the hydrophilic porous membrane using the non-ionic fluorine-based surface active agent can be obtained by merely simply treating a fluorine-based porous membrane substrate and does not require any special process with heat, radiation, etc. as in the prior art. Thus, the mechanical strength and separation performance of the hydrophobic porous membrane substrate are never deteriorated.

The inventors conducted the following experiments for confirming the effect of the third embodiment of the hydrophilic porous membrane.

EXAMPLE 4

A polyvinylidene fluoride porous membrane with an average diameter of 0.45 μm, a porosity of 79% and a weight of 40 mg was prepared. It was held immersed for 10 seconds in a 10 wt % methanol solution of a fluorine-based surface active agent obtained by adding ethyleneoxide to perfluoroalkyl chain (e.g., "Serfuron S-145", a trade name by Asahi Garasu K.K.) and then dried in an oven at 60° C., thus obtaining a hydrophilic porous film. The weight of this hydrophilic porous membrane was measured to be 43 mg. When this membrane was immersed in distilled water, it instantly and uniformly absorbed water, thus showing satisfactory hydrophilicity. Its cytotoxicity and cythemolic toxicity were examined with 100 times autoclave extract. It showed no toxicity, so that it was found to be very safe and suited for medical purposes.

COMPARATIVE EXAMPLE 2

The same porous membrane substrate as in Example 4 was prepared. It was held immersed for 30 seconds in a 10 wt. % methanol solution of a fluorine-based surface active agent obtained by adding amineoxide to perfluoroalkyl chain (e.g., "Serfuron S-141", a trade name by Asahi Garasu K.K.) and then dried in an oven at 60° C., thus obtaining a hydrophilic porous membrane. This membrane, when immersed in distilled water, did not absorb any water even after lapse of 10 minutes. That is, no hydrophilicity was obtained.

COMPARATIVE EXAMPLE 3

A polyvinylidene fluoride porous membrane substrate with an average diameter of 0.22 μm, a porosity of 77% and a weight of 80 mg was held immersed for 30 minutes in a 15 wt. % methanol solution using the same surface active agent as in Example 4 and then dried in an oven at 60° C., thus obtaining a hydrophilic porous membrane. The weight of this membrane was measured to be 104 mg. This membrane, when immersed in distilled water, instantly and uniformly absorbed water, thus showing satisfactory hydrophilicity. However, it slightly showed cytotoxicity and cythemolic toxicity when examined with 100 times autoclave extract as in Example 4. Thus, the membrane was found to be incapable of use for medical and like purposes requiring safety.

A fourth embodiment of the invention will now be described. This embodiment of the hydrophilic porous membrane is obtained by preparing a hydrophobic porous membrane substrate having a polar group on its surfaces and inner pore surfaces and covering the membrane with a hydorphilic polymer film. More specifically, before covering the hydrophobic porous membrane substrate with a hydrophilic film, a group is introduced to the membrane to impart it with prolong release property and insolubility with mutual action with the polar group in the hydrophilic substance.

The material of the hydrophobic porous membrane substrate suitably has a structure capable of detachment of halogenated hydrogen with adjacent C—C coupling. For example, it is suitably at least a member of a group consisting of halogenated vinyl, halogenated vinylidene and copolymer and mixtures of these compounds. The polar group suitably is synthesized from alkyl hydrogensulfate as an intermediate product and contains a hydroxyl group. The hydrophilic substance suitably is polyvinyl pyrrolidone, polyethylene glycol or cellulose carbonate ester.

This hydrophilic porous membrane is manufactured by introducing the polar group (—OH group) causing strong base, sulfuric acid and water to act successively on the hydrophobic porous membrane substrate and immersing the membrane substrate in an aqueous solution of a hydrophilic substance. In this method, it is possible to make use of addition reaction of sulfuric acid when introducing the polar group to C=C coupling, so that it is possible to set a mild condition for the introduction of the polar group. Further, it is possible to introduce the polar group without changing the frame of the hydrophobic porous membrane substrate by washing an ester produced by adding sulfuric acid with water and then causing hydrolysis.

The inventors conducted the following experiments to confirm the effect of the fourth embodiment of the hydrophilic porous membrane.

EXAMPLE 5

A polyvinylidene fluoride porous membrane substrate (0.20 μm, a thickness of 150 μm) was prepared, and it was immersed in methanol and then washed with water for substitution with water. This membrane was held immersed for 5 minutes in a 20 wt. % aqueous solution of sodium hydroxide at 70° C. and washed with distilled water. Then, it was held immersed for 3 minutes in thick sulfuric acid under an ice-cooled condition. Then the membrane was held immersed for 30 minutes in 1.0 wt. % polyvinyl pyrrolidone (e.g., "Wako K30", a trade name) and then dried to obtain a hydrophilic porous membrane according to the invention.

EXAMPLE 6

A polyvinylidene fluoride porous membrane substrate (0.45 μm, a thickness of 130 μm) was prepared, and it was immersed for 5 minutes in a 20 wt. % methanol solution of potassium methoxide at room temperature. Then, it was washed with distilled water, and then held immersed for 3 minutes in condensed sulfuric acid under ice-cooled condition, followed by distillation with distilled water. Then, the membrane was held immersed in a 1.0 wt. % aqueous solution of polyvinyl pyrrolidone for 3 minutes and then dried to obtain the hydrophilic porous membrane according to the invention.

COMPARATIVE EXAMPLE 4

A polyvinylidene fluoride porous membrane substrate was held immersed in a 40 wt. % aqueous solution of potassium hydroxide and 8 wt. % aqueous solution of potassium permanganate at 80° C. for several minutes and then washed with distilled water. Then, the membrane substrate was held immersed in a 0.5 wt. % diluted sulfuric acid solution of sodium hydrosulfate and then neutralized with ammonia. The membrane was then dried with a 0.8 wt. % polyvinyl pyrrolidone. The obtained membrane, although it showed satisfactory hydrophilicity, was ruptured with a pressure of 0.5 kgf/cm$^2$ on a diameter of 45.8 mm. However, a membrane (0.20 μm, thickness of 150 μm) obtained by treating a dehydrosulfated membrane with sulfuric acid withstood rupture up to 0.8 kgf/cm$^2$, thus showing improvement of physical properties.

The first to fourth embodiments of hydrophilic porous membrane may be used to obtain safe liquid filters which are free from toxicity. The liquid filter comprises a cylindrical housing with a liquid inlet at one end and a filtrate outlet at the other end. The hydrophilic porous membrane is disposed in the housing such as to divide the inner space thereof into an inlet side space and an outlet side space. Where this liquid filter is used in a solution administration system in a medical field, a solution administration is filtered. The solution administration was introduced from the liquid inlet to the inlet side space to be filtered by the hydrophilic porous membrane to the outlet side space. The filtrate was then led through the outlet to the outside. The filtrate is free from toxicity and very safe even when the non-ionic surface active agent of the hydrophilic porous membrane flows out. The layout of the housing, liquid inlet, filtrate outlet and porous membrane of the liquid filter according to the invention are the same as with the customary structure, so they are not illustrated.

What is claimed is:

1. A hydrophilic porous membrane comprising a porous membrane substrate based on fluorine having innumerable pores, surfaces of said porous membrane substrate and inner pore surfaces being covered by a non-ionic surface active agent based on fluorine, wherein the hydrophilic porous membrane contains 7.5 to 12.5% by weight of said non-ionic surface active agent based on fluorine with respect to the weight of said porous membrane substrate based on fluorine.

2. The hydrophilic porous membrane according to claim 1, wherein said surface active agent based on fluorine is obtained by adding ethylene oxide to perfluoralkyl chain.

3. The hydrophilic porous membrane according to one of claim 1, wherein said porous membrane substrate based on fluorine is at least a member of a group consisting of vinylidne fluoride and copolymers and mixtures of vinylidene fluoride and propyrene propylene hexafluoride.

4. A hydrophilic porous membrane comprising a hydrophobic porous membrane substrate with innumerable pores, surfaces of said porous membrane substrate and inner porous surfaces being provided with a polar group, said porous membrane substrate being covered by a hydrophilic polymer film.

5. The hydrophilic porous membrane according to claim 4, wherein said hydrophobic porous membrane substrate consists of at least one member of a group consisting of halogenated vinyl, halogenated vinylidene and copolymers and mixtures of these compounds.

6. The hydrophilic porous membrane according to claim 4 or 5, wherein said polar group is synthesized through an intermediate product of alkyl hydrogensulfate.

7. A liquid filter provided with the hydrophilic porous membrane according to one of claims 1 or 4, comprising a housing having an inner space, a liquid inlet and a liquid outlet, said hydrophilic porous membrane being accommodated in said housing inner space such as to divide said inner space into a liquid inlet side space communicating with said liquid inlet, a liquid to be filtered being introduced into said liquid inlet side space from said liquid inlet, and a liquid outlet side space communicating with said liquid outlet, a liquid filtrate from said porous membrane being accommodated in said liquid outlet side space and discharged from said liquid outlet.

* * * * *

UNITED STATES PATENT AND TRADEMARK OFFICE
CERTIFICATE OF CORRECTION

PATENT NO. : 5,203,997
DATED : April 20, 1993
INVENTOR(S) : Noriyuku KOYAMA et al It is certified that error appears in the above-identified patent and that said Letters Patent is hereby corrected as shown below:

In Column 6, line 18, delete "polyvinylidens" and insert -- , polyvinylidene --.

In Column 6, line 19, delete "polyvinylidens" and insert -- polyvinylidene --.

In Column 7, line 16, delete "hydorphilic" and insert -- hydrophilic --.

In Column 7, line 18, after "a" and before "group", insert -- polar --.

In Column 8, line 66, delete "vinylidne" and insert -- vinylidene --.

Signed and Sealed this

Thirtieth Day of November, 1993

Attest:

BRUCE LEHMAN

*Attesting Officer*  *Commissioner of Patents and Trademarks*